UNITED STATES PATENT OFFICE.

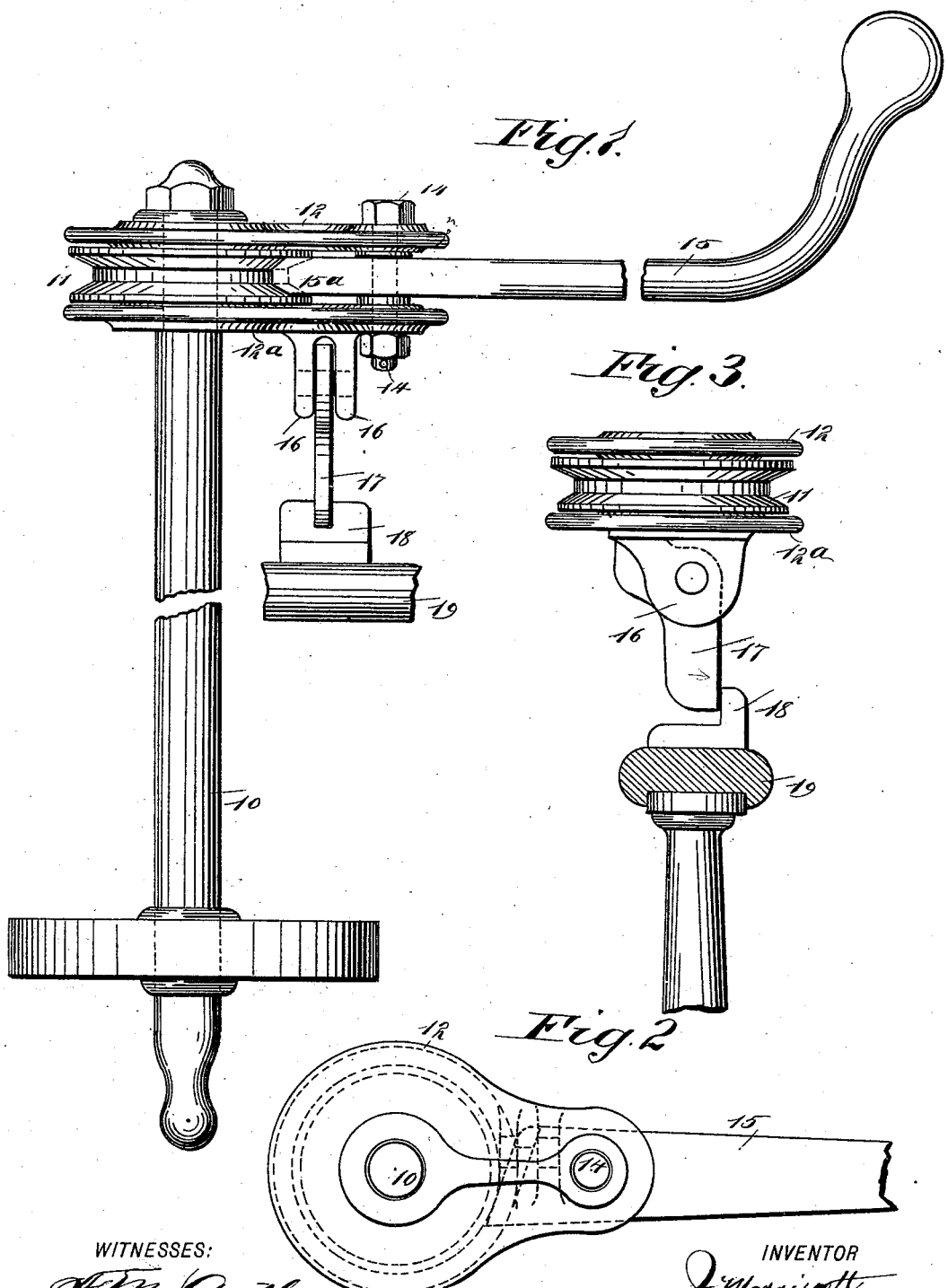

JOHN MARRISSETT, OF VANCOUVER, CANADA.

CAR-BRAKE HANDLE.

SPECIFICATION forming part of Letters Patent No. 514,763, dated February 13, 1894.

Application filed November 21, 1893. Serial No. 491,564. (No model.)

*To all whom it may concern:*

Be it known that I, JOHN MARRISSETT, of Vancouver, British Columbia, Canada, have invented a new and Improved Car-Brake Handle, of which the following is a full, clear, and exact description.

My invention relates to improvements in the crank handle attachments to brake shafts and similar shafts; and the object of my invention is to produce a simple mechanism for connecting the crank handle with the shaft, the parts being arranged in such a way that when the crank is turned in one direction, the brake may be applied, the chain being wound on the shaft in the usual way, and when the brake is released the shaft will turn without turning the crank handle, and thus the handle is prevented from striking and injuring any person or doing any other damage.

To these ends my invention consists of certain features of construction and combinations of parts, as will be hereinafter described and claimed.

Reference is to be had to the accompanying drawings forming a part of this specification, in which similar figures of reference indicate corresponding parts in all the views.

Figure 1 is a broken side elevation of a brake shaft provided with my improved handle. Fig. 2 is a broken plan view of the same; and Fig. 3 is a detail side elevation showing the means for stopping the handle when the brakes are released.

The brake shaft 10 is of the usual kind adapted to be mounted vertically on the car platform, and at its upper end it has a grooved pulley 11, the groove being preferably of a V-shape section, this pulley being keyed or otherwise rigidly fastened to the shaft. The pulley 11 is straddled by brackets 12 and 12ª, placed respectively above and below the pulley and mounted loosely on the shaft so as to project laterally therefrom. The outer ends of the brackets 12 and 12ª are connected by a bolt 14 which forms the fulcrum of the bracket handle 15, the inner end of this handle being tapered, as shown at 15ª, so as to fit snugly in the groove of the pulley 11 and the outer end of the handle being turned up in the customary manner which enables it to be readily grasped.

On the under side of the bracket 12ª are depending lugs 16 between which is pivoted the angular pawl 17, this being adapted to strike a stop 18 on a support 19. This support 19 may represent the rail of a street car or any other suitable support. When the shaft 10 is turned in one direction to apply the brakes, the handle 15 turns on its fulcrum 14 and the tapering end 15 is gripped between the flanges of the pulley 11, so that the shaft may be turned by the handle in the same way as if the handle was rigidly connected to it, but when the brakes are released the handle swings a short distance in the reverse direction and is stopped by the pawl 17 coming in contact with the stop 18, while the shaft continues to revolve so as to permit the unwinding of the brake chain.

It will be observed from the foregoing description that the two bracket plates 12 and 12ª form practically a single bracket, and they will be referred to in the claims as such. It will also be observed that the pawl 17 rides freely over the stop 18 when the handle is turned to apply the brakes, and consequently the handle may be used in the ordinary way without the least inconvenience.

Having thus described my invention, I claim as new and desire to secure by Letters Patent—

1. The combination with the brake shaft, of a pulley rigidly secured thereon, a bracket loosely supported on the shaft adjacent to the pulley, a handle fulcrumed in the bracket and adapted to frictionally engage the pulley, and a stop to limit the movement of the handle in one direction, substantially as described.

2. The combination, with the brake shaft, of a grooved pulley fastened to the shaft, a bracket loosely mounted on the shaft and straddling the pulley, a handle fulcrumed in the bracket and having a tapering end to enter the groove of the shaft, and a stop to limit the movement of the handle and bracket in one direction, substantially as described.

3. The combination, with the shaft, the pulley thereon, the bracket loosely mounted on the shaft and the handle adapted to frictionally engage the pulley, of a pawl pivoted on the under side of the bracket, and a stop in the path of the pawl, substantially as described.

JOHN MARRISSETT.

Witnesses:
L. T. TILLEY,
THOS. E. BARNETT.